March 24, 1953
G. W. LINN
2,632,793
BATTERY TESTER
Filed Sept. 8, 1949
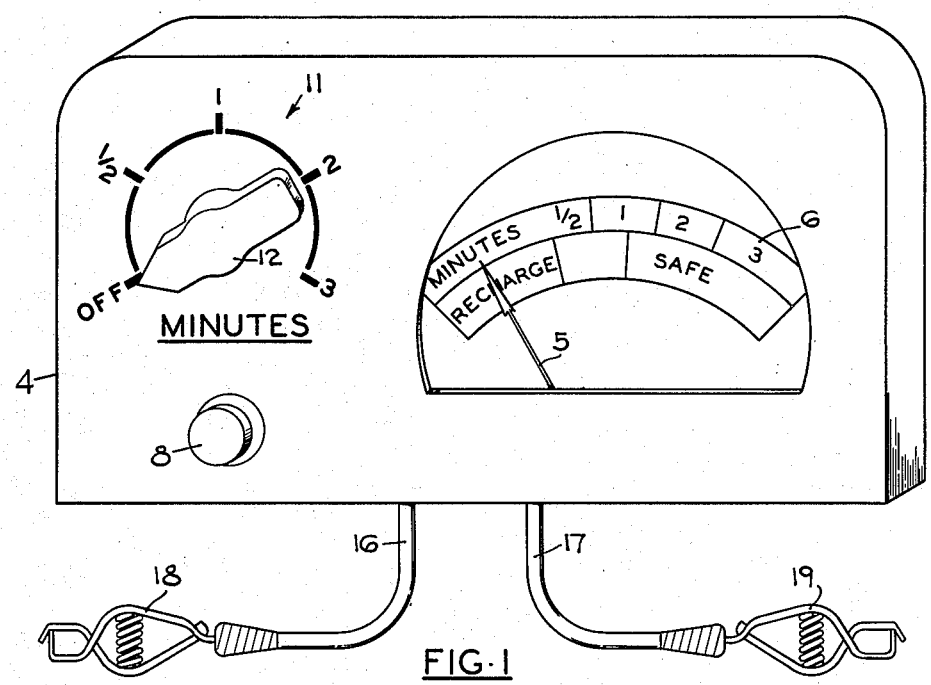
FIG·1
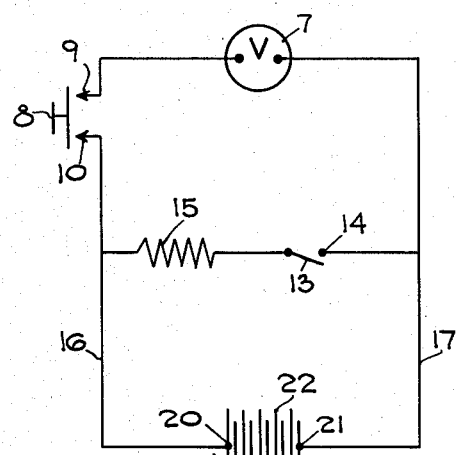
FIG.-2
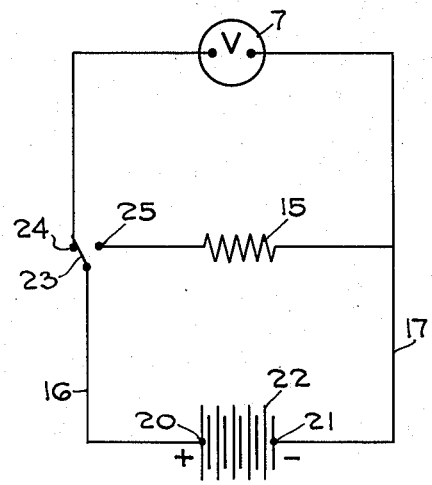
FIG.-3
INVENTOR
GEORGE W. LINN
BY
Edward J. Dwyer
ATTORNEY Patented Mar. 24, 1953

2,632,793

UNITED STATES PATENT OFFICE 2,632,793

BATTERY TESTER

George W. Linn, Philadelphia, Pa., assignor to The Electric Storage Battery Company, a corporation of New Jersey Application September 8, 1949, Serial No. 114,627

5 Claims. (Cl. 175—183)

The invention relates to methods and apparatus useful in testing secondary batteries by measuring the open circuit voltage thereof, and is particularly useful with relation to those batteries that, immediately prior to the time of test, have been subjected to an indeterminate period of charge or discharge.

In the testing of automotive type batteries in situ in the vehicle by measuring the open circuit voltage of the battery, there is always present an unknown and unknowable factor that is likely to contribute to errors in the test results i. e. the period of activity that the battery has undergone immediately prior to arrival at the test location. If, for example, an automobile has been driven for a number of miles with the generator charging at the maximum rate, it is possible that the open circuit voltage may be as high as 2.30 volts per cell. On the other hand, the battery in an automobile that has been driven only a short distance in traffic during which time the battery has been discharging may give an open circuit reading as low as 2.05 volts per cell. This situation is a result of the recent activity of the battery and is true even though the two batteries are actually at the same state of charge.

In the description and claims that follow, the phrase "apparent open circuit voltage" is used to describe this condition and to distinguish such voltage from the correct open circuit voltage which it is an object of the invention to determine and which gives a true indication of the state of battery charge. The condition giving rise to the phenomena of "apparent open circuit voltage" is thought to stem from the electrochemical reaction that occurs during the charging process i. e. $PbSO_4 + H_2O \rightarrow PbO + H_2SO_4$. In other words, as a result of the charge current, the lead sulphate in the battery plates reacts with the water in the cell to form lead oxide and sulfuric acid. When the charging and consequent reaction takes place at a high rate, a layer of high gravity acid fills the pores of the plates and also clings to the surface thereof. As a result, therefore, when an open circuit reading is taken before sufficient time has elapsed to permit the high gravity acid to diffuse throughout the cell and equalize the gravity thereof, a false or "apparent" open circuit voltage is given that is higher than the correct open circuit voltage. The converse of this situation is equally true i. e. where the battery has been subjected to a period of discharge immediately prior to test, a layer of low gravity acid surrounds the plates thus giving an "apparent" open circuit voltage lower than the correct open circuit voltage. During the minimum .5 minute discharge given each battery, the gravity of the electrolyte tends to equalize itself throughout the cell and, it may happen that, in this case, the correct open circuit voltage will be higher than the "apparent" open circuit voltage even after the discharge period.

That this problem has heretofore been recognized is shown by the fact that one test method in use requires the burning of the car lights for a fixed period, generally 1 or 2 minutes, in an attempt to counteract the effects of recent activity. It should be noted in this connection, however, that all batteries, regardless of their activity or "apparent" voltage are subject to the same discharge.

It is apparent, therefore, that such procedure will accomplish the desired result i. e. the dissipation of the effects of recent activity so as to permit the determination of true open circuit voltage only when the activity of the battery is within a certain range. In the case of the battery mentioned above in which the open circuit voltage was 2.30 volts per cell, such arbitrary period of time might be insufficient, whereas, in the case of a battery whose cells have a voltage of 2.05, the same period of discharge would be too great. Where the period of discharge is insufficient, a battery that is actually about 50% charged may be read as 75% or 100% charged. Conversely, an unduly extended discharge tends to overdepress battery voltage with the result that the same battery might be read as only 25% charged.

It is, therefore, an object of the invention to provide a method and means whereby the open circuit voltage of a battery can be measured as a true indication of battery charge despite the effects of recent activity. In achieving this object, as will be hereinafter seen, a method and means are provided to reduce the "apparent" open circuit voltage to the correct or true open circuit voltage by providing a discharge period, the duration of which is determined by the previous activity to which the battery has been subjected.

Other objects of the invention will be apparent from the description and claims that follow.

In the drawing, like numerals are used to designate like elements.

Figure 1 is an elevational view showing one embodiment of my invention.

Figure 2 is a schematic view of one form of circuit that can be used in achieving the objects of my invention.

Figure 3 is a schematic view similar to but showing certain variations in the circuit shown in Figure 2.

Referring now to the drawing, particularly Figure 1, the numeral 4 indicates the housing for a battery tester designed in accordance with my invention.

Encased within housing 4 is a voltmeter, the pointer and scale of which are shown at 5 and 6 respectively in Figure 1, the voltmeter itself being indicated schematically as at 7 in Figures 2 and 3. Voltmeter scale 6 is divided into two portions, the upper portion thereof bearing the legend "Minutes" and being calibrated in terms of such periods of time, whereas the lower portion bears the legends "Recharge" and "Safe" at appropriate points thereon. The purposes of such scale and the legends thereon set forth will be hereinafter described.

Adjacent voltmeter scale 6 is shown a push button or other suitable circuit closing device 8 which, as shown in Figure 2, normally remains open but is adapted to close the circuit between contact points 9 and 10 respectively. Above push button 8 is a timer 11 having a pointer 12. The face of the timer is calibrated in terms of minutes and further comprises, as shown in Figure 2, switch 13, contact point 14, and resistance 15. Such timer may be any one of a number of well known commercial devices and, as such, is not claimed as my invention except in combination with other elements shown and described herein.

Housing 4 is further provided with leads 16 and 17 and terminal contacts 18 and 19 respectively. It will be understood that terminal contacts 18 and 19 can be clips as shown, or prods, or any other means suitable for making the test connection with terminals 20 and 21 of a storage battery 23.

The operation of the device shown in Figures 1 and 2 is as follows. Clips 18 and 19 are brought into contact with terminals 20 and 21 respectively of storage battery 22. Push button 8 is closed on contact points 9 and 10 thus closing the voltmeter circuit which comprises the battery, terminals, and contacts above mentioned and, in addition, lead 16, contact point 10, push button 8, contact point 9, voltmeter 7, and lead 17, thereby permitting the electromotive output of battery 22 to flow through voltmeter 7. A reading in "minutes" is taken according to the position of pointer 5 with relation to the upper portion of voltmeter scale 6. It will be understood that such portion of scale 6 has been so calibrated as to give a direct reading of the period of time that it is necessary to discharge the battery to dissipate the effects of recent activity as hereinbefore described. Such scale could, however, if desired be calibrated directly in terms of volts which could then be translated into time.

After the indication of the requisite discharge time has been obtained, the push button 8 may, if desired, be opened to break the voltmeter circuit. Pointer 12 of timer 11 is turned to the proper minute indication thus bringing switch 13 into contact with contact point 14 thereby closing the resistance circuit and permitting the battery to discharge through resistance 15 for the desired period of time. Resistance 15 is preferably in the nature of 0.3 to 0.4 ohm, a resistance that will permit a current of approximately 20 amperes to flow under an electromotive force of substantially 6 volts. It will be understood that resistances of other values could be used without departing from my invention it being only necessary to recalculate the discharge period on the basis of the changed resistance. The range of 0.3 to 0.4 ohm has been chosen specifically because it is an approximation of the load that can be placed on an automotive battery by the use of the normal automobile lights.

At the end of the discharge period, pointer 12 returns to its normal position thereby opening switch 13 and breaking the resistance circuit.

In order to determine the true or correct open circuit voltage, push button 8 is again actuated to close the voltmeter circuit. For this reading the lower portion of scale 6 bearing the legends "Recharge" and "Safe" is used. It will, of course, be understood that such scale could be calibrated directly in terms of voltage or percentage of charge. On the basis that has been used for calibrating the scale, the maximum voltage for the "recharge" zone is 6.105 volts. The "safe" zone covers the voltage range above 6.15 volts. The zone between 6.105 and 6.15 volts may be termed the "neutral" or "warning" zone wherein a reading indicates that the condition of the battery is approaching the danger point. It will also be understood that such portion of the scale could, if desired, be calibrated in terms of specific gravity of the electrolyte on the basis that a change of .01 volt indicates approximately a 10 point change in specific gravity.

Figure 3 shows a slightly different form of the present invention. Push button 8 is eliminated. Timer 11 is connected to switch 23 which normally remains closed against contact point 24 when pointer 12 is in the "off" position. It will be apparent, therefore, that, in this form of the invention, the voltmeter circuit is ordinarily closed so as to permit immediate flow of current through voltmeter 7 when clips 18 and 19 are connected to terminals 20 and 21 of battery 22.

As hereinbefore described, the "apparent" open circuit voltage shown on the upper portion of scale 6 of the voltmeter is the basis that determines the duration of the discharge period required to counteract the effects of recent activity to which battery 22 has been subjected. Pointer 12 of timer 11 is turned to the proper time indicia thereby opening the contact between switch 23 and contact point 24 and closing the contact between switch 23 and contact point 25. This action breaks the circuit through voltmeter 7 and closes the circuit through resistance 15 thus starting the discharge of battery 22 for the desired period of time under the control of timer 11.

When the discharge period has expired and pointer 12 returns to the normally "off" position, switch 23 moves away from contact point 25 and into contact with contact point 24 thereby breaking the resistance circuit and closing the voltmeter circuit. Current from battery 22 passes through voltmeter 7 immediately upon the closing of the voltmeter circuit and the condition of the battery is indicated as hereinbefore described upon the lower portion of scale 6.

In the foregoing specification and drawing, the invention has been described and shown as a means and method for determining the correct open circuit voltage of a battery by connecting the device shown in Figure 1 across the terminals thereof to determine initially the "apparent" open circuit voltage. It is entirely possible to obtain the same results by initially determining the "apparent" open circuit voltage of each cell and correlating the discharge period of the battery to the cell showing the highest voltage. In this situation, obviously, the zones on the lower portion of scale 6 would cover the following ranges: "recharge," 0–2.035 volts; "neutral," 2.035–2.05 volts; "safe," above 2.05 volts.

It will be seen, therefore, that there has been devised a novel method and means for obtaining a correct indication of a true condition of a battery that has been subjected to a period of activity immediately prior to the test. This is accomplished by correlating to such period of activity, the period of discharge to which the battery is subjected and which dissipates the effects of recent activity as shown in the "apparent" open circuit voltage of the battery and permits determination of the true or correct open circuit voltage thereof.

While there have hereinbefore been disclosed certain embodiments of the invention, other forms and variations thereof will be readily apparent to those skilled in the art. It is not intended, therefore, to be limited to any such specific disclosure but only by the scope of the claims appended hereto.

I claim:

1. The method of testing a storage battery immediately following a period of indeterminate activity, which comprises measuring the apparent open circuit voltage of said battery, partially discharging said battery through a known resistance for a period of time determined by said apparent open circuit voltage, and measuring the resulting open circuit voltage whereby a true indication of battery charge is obtained.

2. The method of testing a storage battery that has been subjected to an indeterminate amount of charge or discharge, which comprises passing the current through a voltmeter to measure the apparent open circuit voltage of the battery, simultaneously disconnecting said voltmeter and discharging the battery through a known fixed resistance for a period of time determined by said apparent open circuit voltage, and at the end of said discharge automatically disconnecting said resistance, reconnecting said voltmeter, and measuring the resulting open circuit voltage.

3. In a method of testing a storage battery wherein the apparent open circuit voltage of said battery is measured immediately following a period of indeterminate activity, the steps of partially discharging said battery through a known resistance for a period of time determined by said apparent open circuit voltage, and measuring the open circuit voltage.

4. A device for testing a storage battery immediately following a period of indeterminate activity, which comprises means for measuring the open circuit voltage of said battery, a fixed resistance, means for connecting said resistance across the terminals of said battery for a predetermined period of time, and means for automatically reestablishing connection between said battery and said measuring means when said predetermined period of time has elapsed.

5. A device for testing a storage battery immediately following a period of indeterminate activity, which comprises a voltmeter, a fixed resistance, means for connecting said resistance across the terminals of said battery for a predetermined period of time, and means for automatically and simultaneously disconnecting said resistance and connecting said voltmeter to the battery when said predetermined period of time has elapsed.

GEORGE W. LINN.

REFERENCES CITED

The following references are of record in the file of this patent:

UNITED STATES PATENTS

| Number | Name | Date |
|---|---|---|
| 1,520,865 | Heyer | Dec. 30, 1924 |
| 1,922,792 | Cain | Aug. 15, 1933 |
| 2,270,554 | Pugh | Jan. 20, 1942 |
| 2,540,225 | Wengel et al. | Feb. 6, 1951 |